Nov. 29, 1966  A. W. SPARROW  3,288,119
PUMPS FOR ROTARY ENGINES
Filed Jan. 27, 1964  10 Sheets-Sheet 4

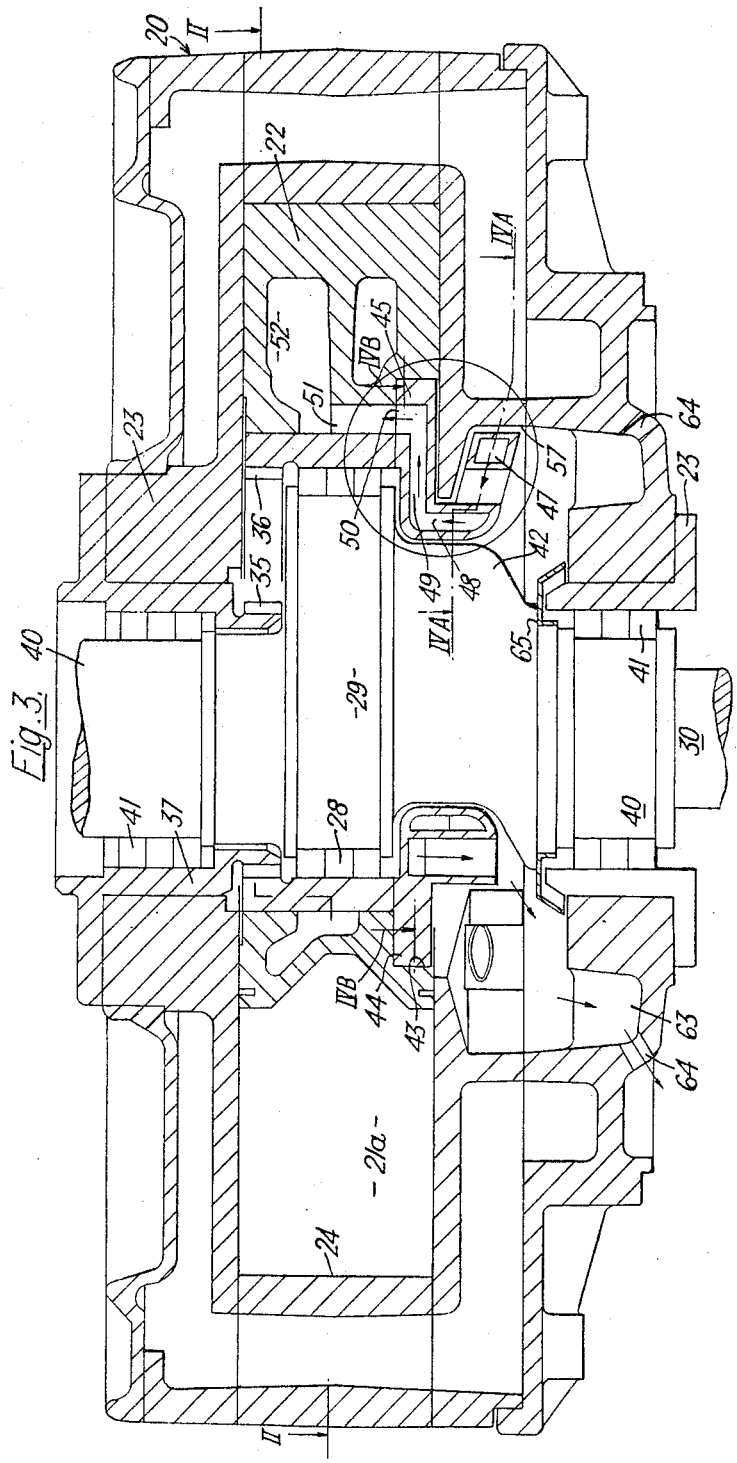

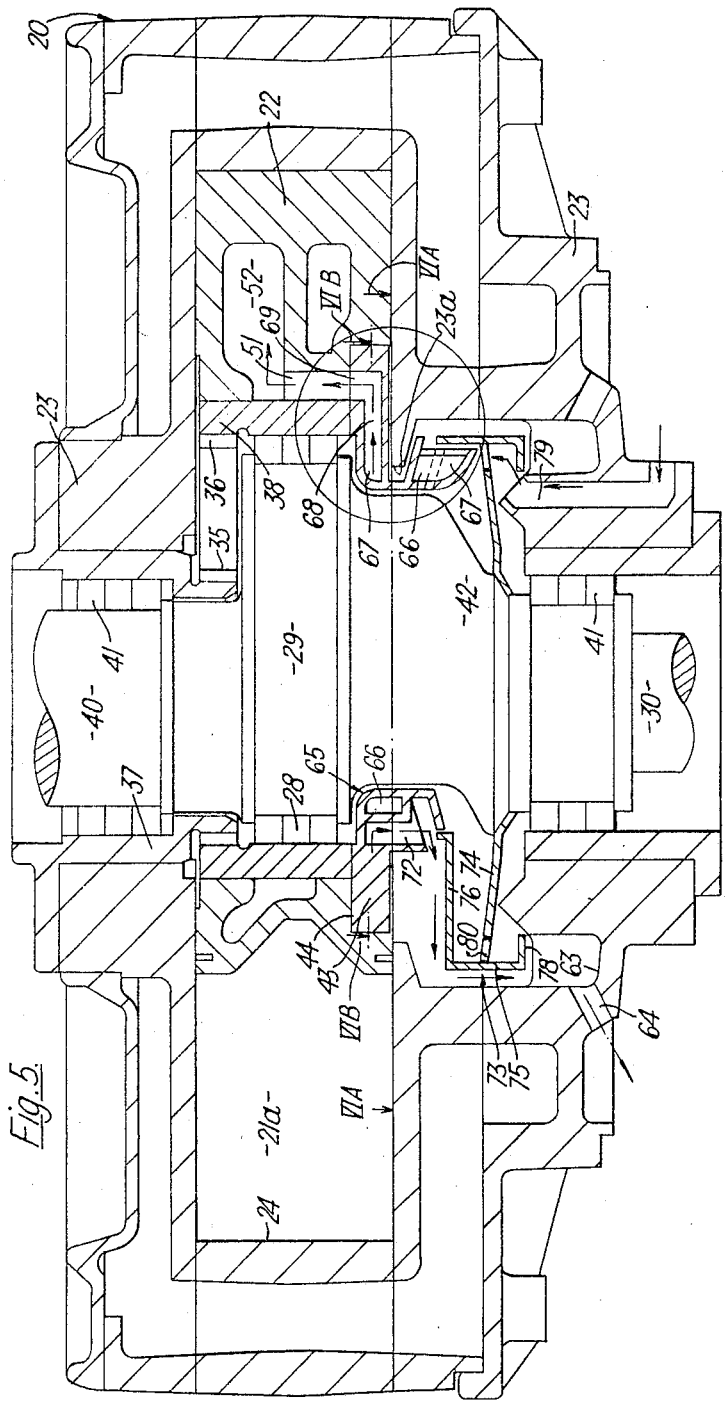

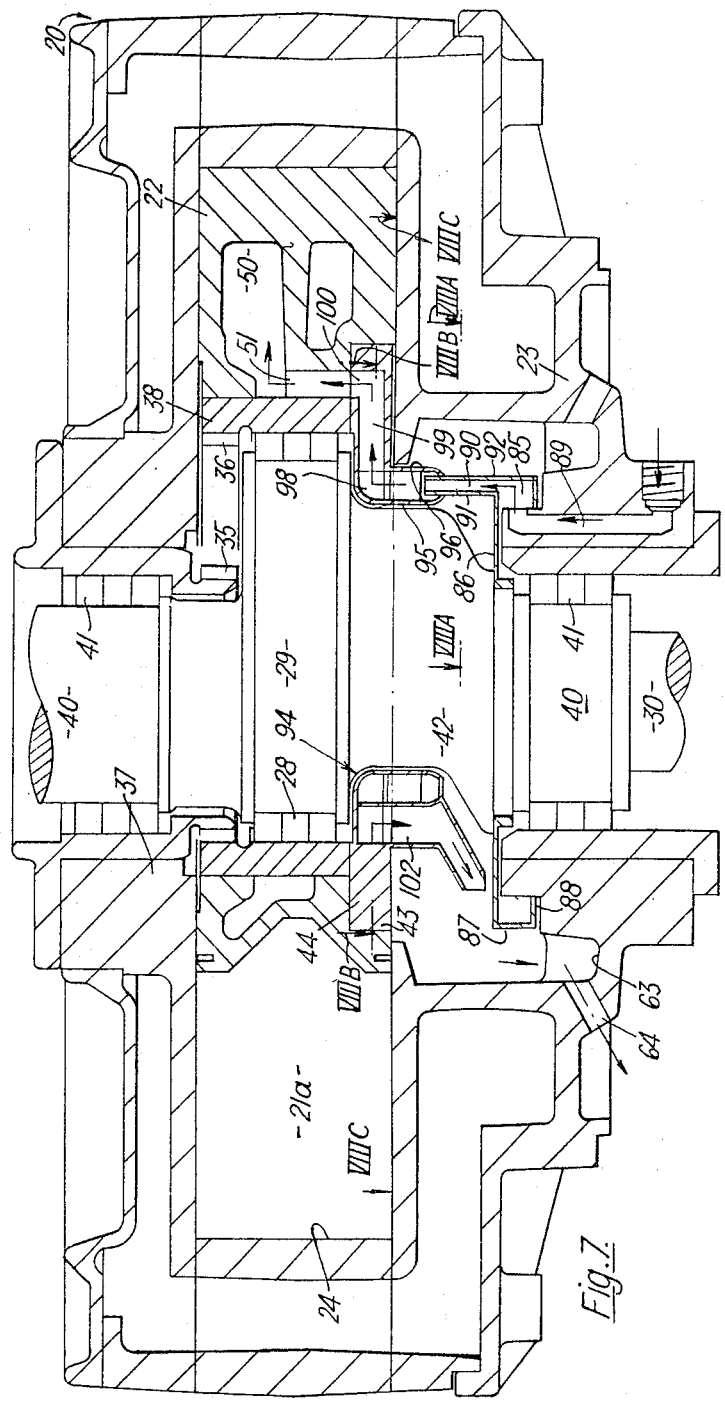

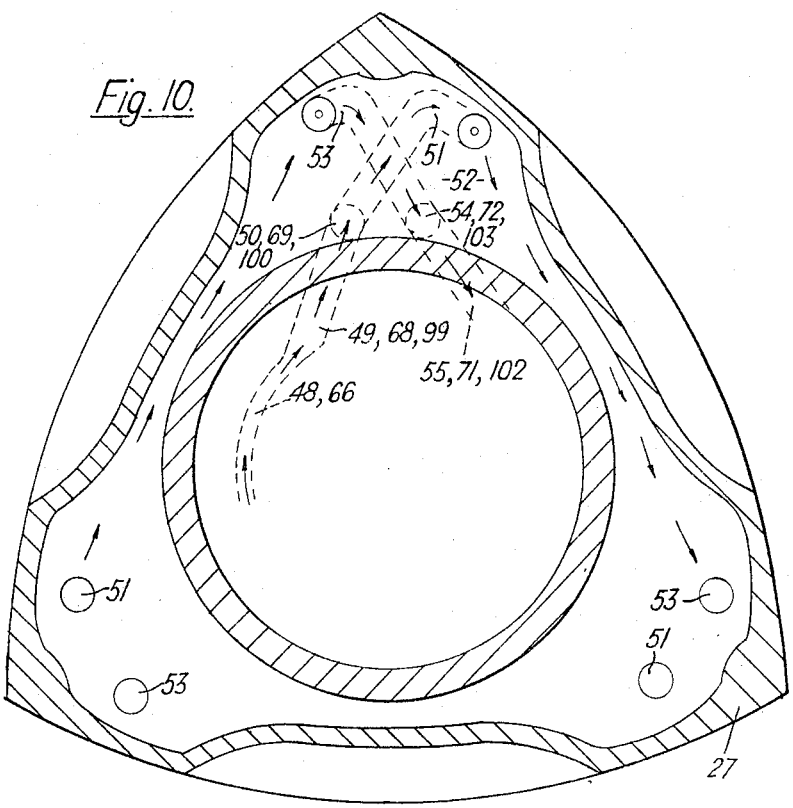
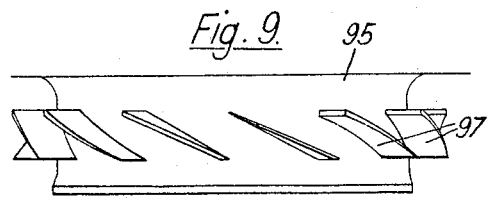

United States Patent Office 3,288,119
Patented Nov. 29, 1966

3,288,119
PUMPS FOR ROTARY ENGINES
Alan W. Sparrow, Peterborough, England, assignor to
F. Perkins Limited, London, England, a British
company
Filed Jan. 27, 1964, Ser. No. 340,374
Claims priority, application Great Britain, Jan. 28, 1963,
3,494/63
11 Claims. (Cl. 123—8)

This invention relates to pumps and more particularly to pumps especially suitable for cooling of rotary engines of the type having an inner rotor constrained to be rotatable in a cavity of an engine housing, the inner rotor being mounted for eccentric rotary movement about an engine shaft axis.

Internal combustion engines of the rotary piston type present different technical problems than do reciprocating piston internal combustion engines. One of these problems is that of cooling the rotary piston member. Since the rotor is completely enclosed, air cooling of the same is impossible. Liquid cooling by oil or water has proved difficult since it has previously been necessary to feed the cooling liquid under pressure from the stationary portion of the engine to the rotor for absorption of heat and back to the stationary engine portion where the heat is removed. This pressure makes sealing difficult and if water, with its high specific heat, is used as the coolant, it is difficult to keep the water under pressure separated from the oil lubricated bearings of the engine. The use of a pressurized coolant also presents churning and turbulence problems that create heat and energy losses.

It has been proposed to utilize the eccentric rotation of certain types of rotary engines to provide the medium of pumping the coolant into and out of the rotor. Such proposals utilize a common coolant chamber or reservoir between the end wall adjacent one side of the rotor as a source of cooling liquid, a plurality of passages formed in the rotor for receiving liquid and transmitting the same through the rotor and out the other side of the rotor to a common chamber between the other rotor side and the end wall adjacent thereto.

The fluid is caused to move through the rotor by means of the eccentric movement of the rotor resulting in varying centrifugal or acceleration forces that act on the coolant to move the same through the rotor passages into a common collecting chamber within the rotor. This proposed construction presents a number of problems including that of insufficient cooling due to insufficient mass flow through the rotor for adequate cooling. Furthermore the cooling is not uniform throughout the rotor and in some cases there is churning of the cooling liquid due to the fact that there are actually two moving elements in the engine, i.e. the output shaft and the rotor, which elements are moving at different rotational speeds.

It is therefore an object of the invention to provide an improved rotor cooling system for an internal combustion rotary engine.

It is a further object to provide an improved cooling system for such an engine that utilizes the compound eccentric rotary motion of the rotor to cause cooling fluid to circulate through the rotor.

Still another object of the invention is to provide a cooling system having a plurality of individual cooling circuits that convey cooling fluid through different portions of the rotor.

A further object is to utilize fluid scoops that rotate in a common reservoir of cooling fluid to collect distinct quantities of fluid during a certain portion of each revolution of the rotor.

Still a further object is to provide a cooling system that utilizes the relative speeds between different parts of the engine to cause pumping of the cooling fluid through the rotor.

These and other objects and advantages will be readily apparent to those skilled in the art from the following description and accompanying drawings in which:

FIGURE 3 is a cross section on line III—III of FIGURE 2 and shows details of a first embodiment of the invention.

FGURE 4 is a composite figure showing sections on lines IV A and IV B in FIGURE 3 and illustrates movement of coolant through the passages.

FIGURE 5 is a similar cross section to that of FIGURE 3 and illustrates a second embodiment of the invention.

Figure 4:
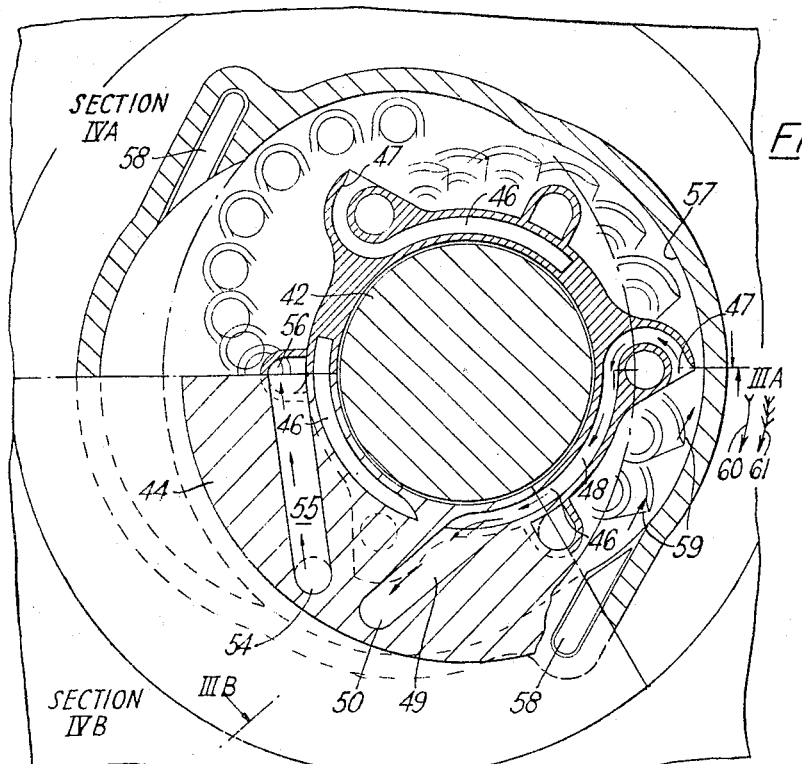
Figure 6:
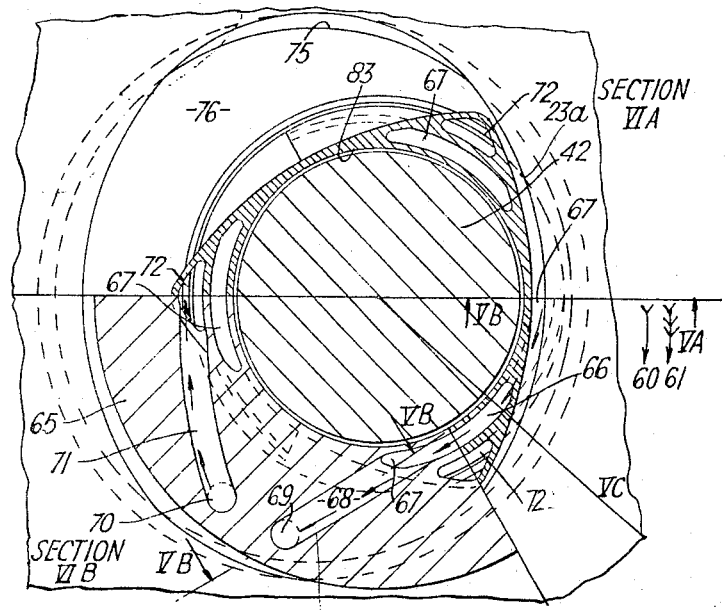

FIGURE 6 is a composite figure similar to that of FIGURE 4 and shows cross sections on lines VI A and VI B in FIGURE 5.

FIGURE 7 is a similar cross section to that of FIGURE 3 and illustrates a third embodiment of the invention.

Figure 8:
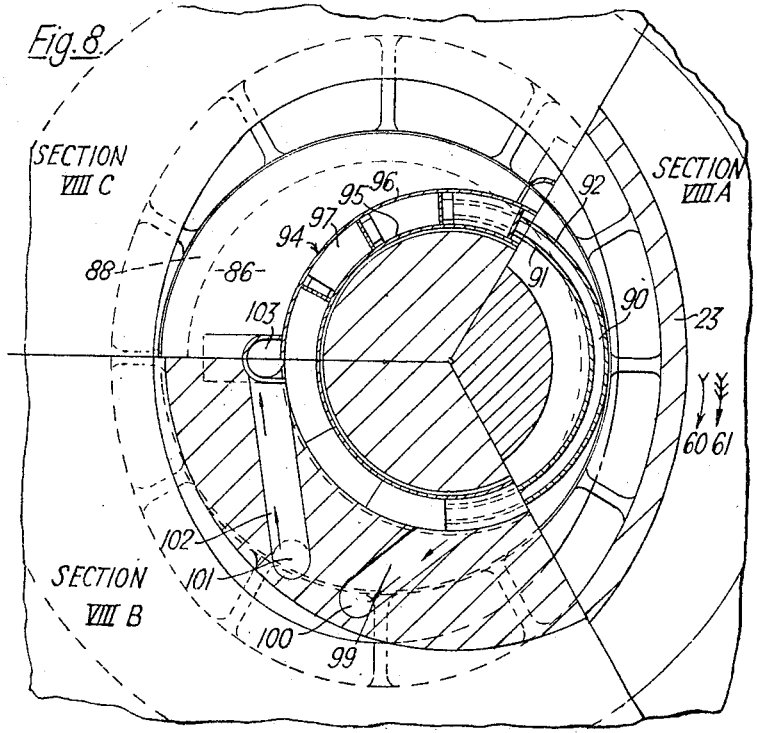

FIGURE 8 is a composite figure similar to that of FIGURE 4 and shows cross sections on lines VIII A and VIII B and VIII C in FIGURE 7.

FIGURE 9 is an elevation of a part of the passage defining means of the embodiment shown in FIGURE 7.

FIGURE 10 is a cross section through a rotor suitable for use with the present invention and illustrates the type of coolant flow which can be expected therein.

Figure 12:
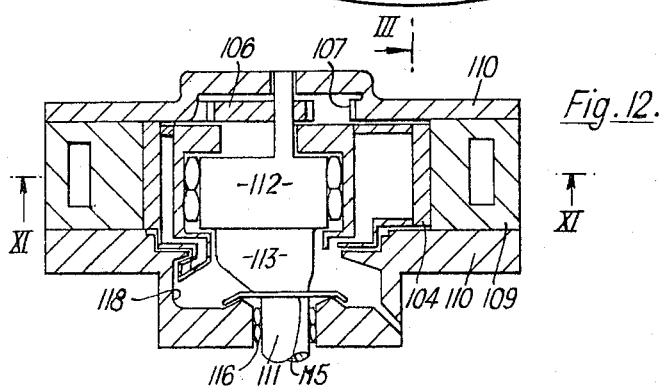
Figure 11:
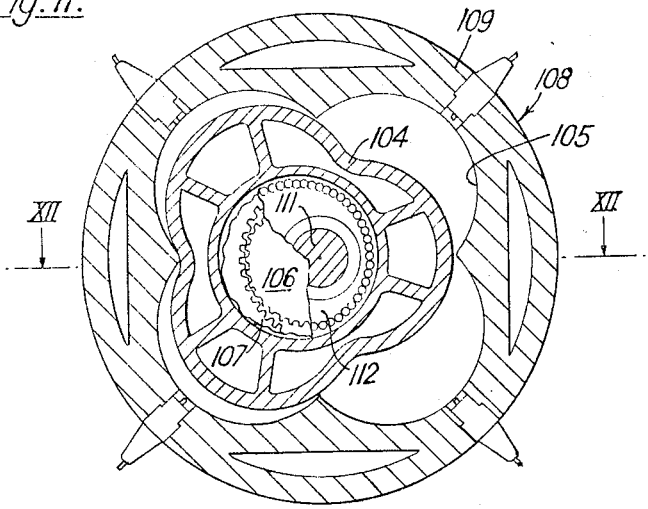

FIGURE 11 is a cross section on line XI of FIGURE 12 showing a second type of rotary engine to which the present invention can be applied.

FIGURE 12 is a cross section on line XII of FIGURE 11 and shows an embodiment of the invention.

Figure 13:
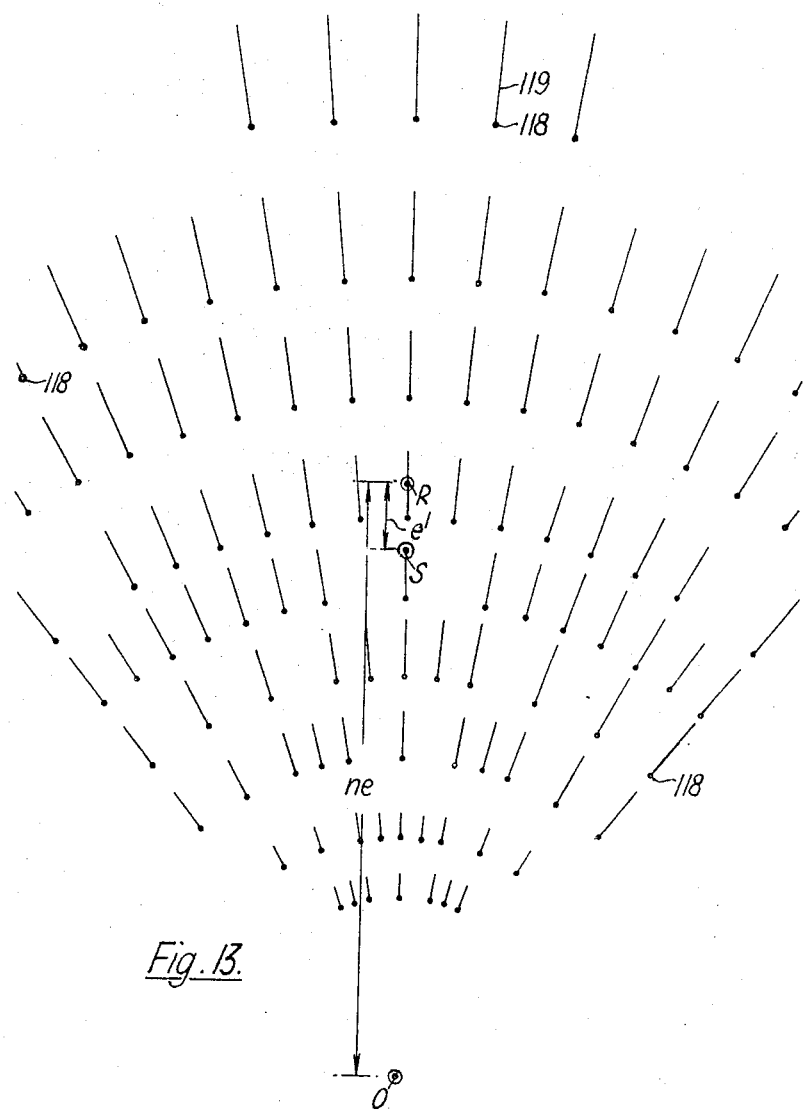

FIGURE 13 is a diagrammatic representation of the acceleration field.

Figure 14:
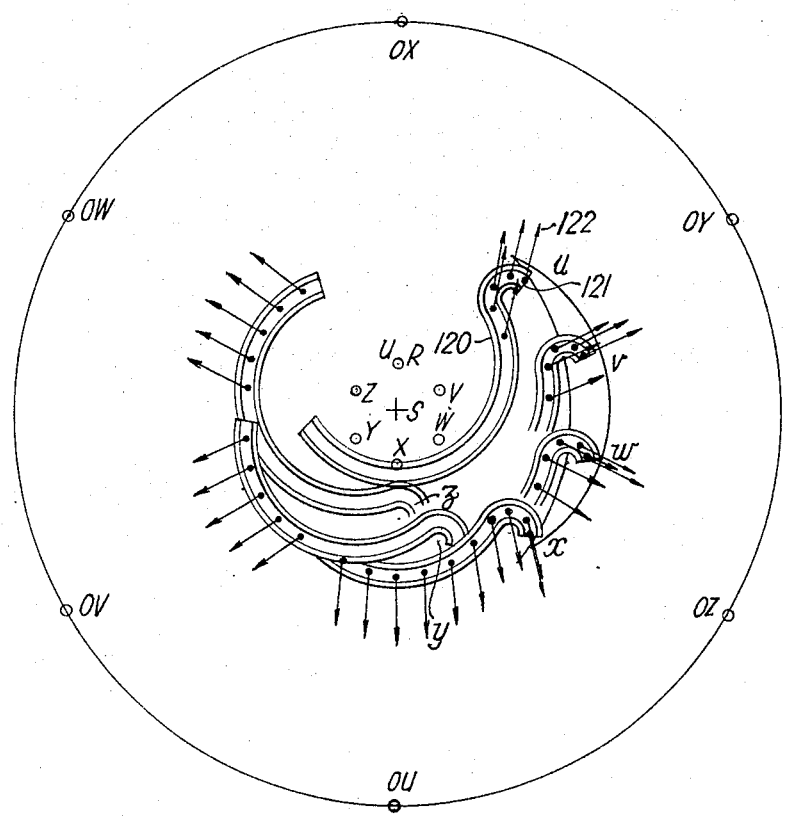

FIGURE 14 shows the manner in which the rotating acceleration field acts upon particles of coolant in a passage of the passage defining means.

In order to fully understand the invention and its application to known rotary engines there will now be described a general discussion of the operation of these engines and the theory of operation thereof.

As mentioned above, a number of rotary engines make use of a rotor mounted on an eccentric. Two particular types at least are suitable for incorporation of the present invention to effect cooling of their rotors. Both types of engine make use of the geometry of a closed epitrochoid and a related shape. In one type the related shape is an externally related shape and in the other type of engine an internally related shape. In the geometry of both types of engines the epitrochoid and its related shape are obtained by a rolling motion of two circular profiles one on the other, one being disposed within the other.

The rolling motion of the two circular profiles can be simulated in practice by regarding the profiles as the pitch circles of meshing gears, one being disposed within the other. Alternatively the rolling motion can be simulated by the use of suitably shaped cams and followers, usually an epitrochoidal cam with three followers, the shape of the cams having been originally obtained from the required profiles. It will be apparent therefore, that the circular profiles need not be actual physical features of the engine but if cams are used the motion will be a rolling one just as if two imaginary profiles were constrained to roll on each other. The term "circular profile" should be construed accordingly, and should include an engine wherein cams and followers are used to achieve the desired rolling motion.

According to the invention the pump for pumping liquid comprises a first element having a circular profile thereon, a second element having a circular profile thereon, one profile being disposed within the other, constraining means to maintain said profiles in rolling relationship with each other, driving means for said second element, and passage-defining means movable with said second element and arranged to receive liquid into one end thereof and to deliver it from the other, the disposition of the passage being such as to allow liquid to be moved from one end to the other of said passage-defining means mainly under the influence of acceleration forces engendered by the motion of said second element.

Preferably the first element defines a trochoidally shaped cavity and said second element comprises a rotor having a shape related to said trochoidally shaped cavity. Alternatively the first element defines a cavity having a shape related to a trochoidal shape while the said second element comprises a rotor having the trochoidal shape. The first and second circular profiles are constituted by the pitch circles of a pair of meshing gear wheels one being disposed within the other, said gear wheels also constituting said constraining means and the internal one of said gear wheels being associated with the element having said trochoidal shape.

According also to the invention there is provided a rotary engine of the type having a housing a first circular profile associated therewith, a rotor rotatable within said housing, a second circular profile associated with the rotor, one profile being disposed with the other profile in rolling relationship thereto, constraining means to maintain said profiles in rolling engagement with each other, and power transmitting support means for said rotor, passage-defining means movable with said rotor, said passage-defining means including at least one entry opening for receiving coolant, and at least one exit opening for discharging coolant, one opening being situated outside the rotor and the other communicating with a hollow compartment within said rotor, the disposition of the passage between said openings being such as to allow coolant to pass from one end to the other mainly under the influence of acceleration forces engenedered by the motion of said passage defining means.

Preferably the passage defining means defines at least one passage for conveying coolant into the rotor and at least one passage for conveying coolant away therefrom. Also a passage so defined has a portion thereof extending helically with respect to the axis of the rotor. Alternatively and/or additionally the passage may have a portion which extends spirally with respect to the axis of the rotor. The entry opening can be arranged to receive coolant from a reservoir within the rotor, or from a reservoir associated with a stationary engine housing, or from a reservoir associated with the power transmitting support means.

Preferably also the rotary engine comprises a rotor having a shape related to an epitrochoid movable in an epitrochoidal cavity in the engine housing. Alternatively the rotor has an epitrochoidal shape and is movable in an engine housing cavity having a related shape. The constraint applied to the rotor comprises a pair of meshing gear wheels for preference.

When an alement rotatably mounted on an eccentric itself carried by a shaft is constrained to move so that all points on the element describe closed epitrochoidal paths it is now known that all particles of the element are subject to forces due to a rotating acceleration field which rotates in unison with the eccentric. The rotating field can be termed a vector field, the vectors in this context being accelerations. The rotative speed of the vector field relative to the rotor is subject to the nature of the constraint applied to the rotor, and is bound up with the fact that the epitrochoid must be a close one for any practical application of the rotating vector field phenomenon.

One constraint which can be applied to the element is that a large gear wheel disposed on the element meshes with a smaller gear wheel disposed within it the latter being stationary in relation to both the element and the eccentric. This applied constraint together with the rotation of the eccentric generates the rolling motion of one gear pitch circle on the other. The result of such a motion is that any point on the element describes a path which in general will not retrace itself. In order to make the path retrace itself the diameters of the gear wheels must bear a certain ratio to each other, e.g. by choosing the ratio of the diameter of the internal gear to the external gear to be 2:3 the path will become a closed epitrochoid having two lobes. If the element is thought of as a rotor of an engine there will be three equi-angularly and equi-radially spaced apex points on the rotor which will follow each other over the same closed epitrochoid if the above ratio is adhered to. The shape of rotor which will only just rotate within an epitrochoidal cavity is related to the epitrochoid and will be known as an internal related shape.

In the case of the two lobed epitrochoidal engine with the three apex rotor the speed of the eccentric is three times that of the rotor when the housing is stationary. Hence the rotating vector field, rotating with the eccentric, sweeps three times through the rotor while the latter rotates only once relative to the stationary housing.

When the type of constraint which is applied to element consists of the same large and small gear wheels as before but in this case the large gear is held stationary and the smaller gear wheel is fixed to the element, the particles of the element are again subject to a rotating acceleration field. If the same ratio of 2:3 is maintained for the ratio of the diameters of the two gear wheels and the shape of the element is that of a two lobed epitrochoid it is found that the envelope of the surface of the epitrochoidal element is a related shape having three lobes, each lobe being separated from its neighbor by an inwardly presented point or apex. If the element is now thought of as an epitrochoidal rotor moving in a cavity of related shape, an external related shape, it will be found that the eccentric rotates at twice the rotor speed and that the eccentric and rotor rotate in opposite directions. Also the acceleration field, rotating with the eccentric sweeps three times through the rotor while the latter rotates once in an opposite direction both directions being relative to the stationary housing.

It will be appreciated that though the phenomenon of the rotating vector field has been described with reference to a double lobed basic epitrochoid as an example the invention can be applied to an engine wherein the basic epitrochoid has any number of lobes.

Figure 2:
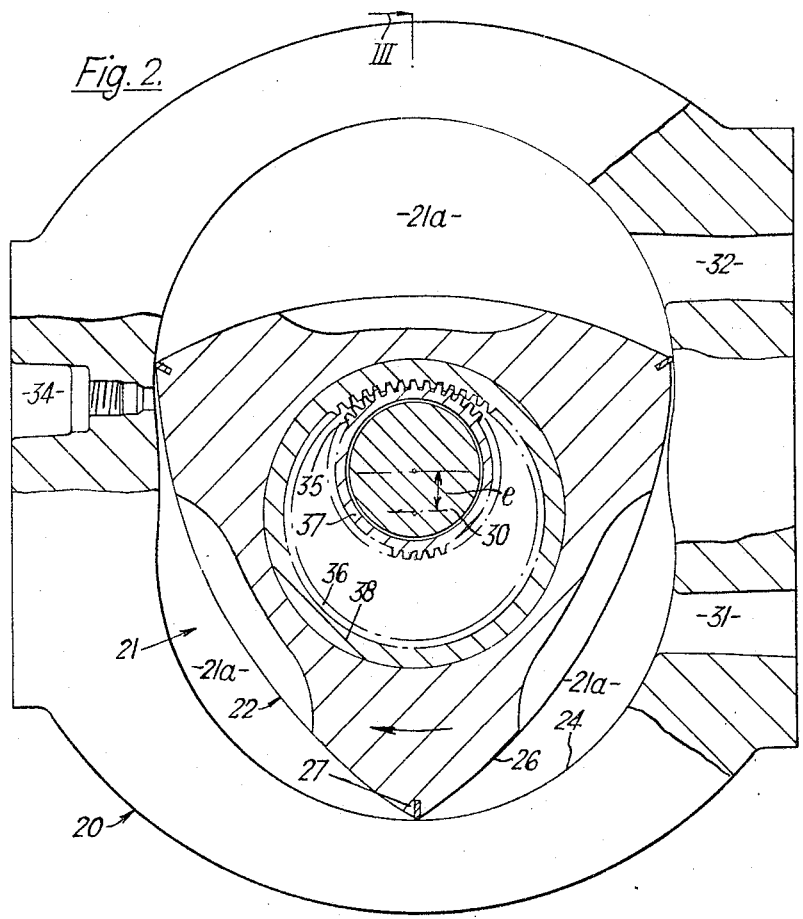
FIGURE 2 is a partial cross section through the engine on the line II in FIGURE 3.

One particular type of rotary engine envisaged as being suitable for cooling by the pump according to the present invention comprises a housing 20 having a cavity 21 therein, a rotor 22 received within the cavity 21 and rotatable therein, the rotor 22 and housing 20 having relatively spaced parallel axes. The cavity 21 is enclosed between axially spaced end walls 23 and a peripheral wall 24 of the housing. The rotor 22 has axially spaced end walls 25 and peripherally extending walls 26 extending between apex portions 27 slidably engageable with the peripheral wall 24 to form three variable volume working chambers 21a (FIGURE 2) within the cavity 21. The working chambers 21a vary in volume. The contour of the peripheral wall 24 is a double lobed epitrochoid of apex portions 27 of the rotor 22, that of the rotor 22 being of internally related shape to the epitrochoid.

The rotor 22 is mounted on roller bearings 28 for rotation about an eccentric 29 itself rotatable with a shaft 30 journalled in the end wall 23 of the housing and passing through at least one such end wall for the purpose of transmitting power elsewhere.

A combustible charge is admitted to and exhausted from the working chambers 28 by the inlet port 31 and the outlet 32 respectively and ignited by a spark plug 33 suitably positioned in a cavity 34 in the housing 20. An important part of the engine is the meshing gear wheel pair 35 and 36 (FIGURE 2) which constrains the rotor 22 to move so that all points thereon trace out separate epitrochoids. The gear 35 is an external gear formed on a ring 37 fixed to the housing 20 concentrically with the shaft 30. Gear 36 is an internal gear formed on a ring 38 attached to the rotor 22. The diameter ratio of gear 35 to gear 36 is 2 to 3. The gear diameters are also a fixed multiple of the eccentricity $e$, the gear 35 being $4e$ in the case of the engine now described.

Figure 1:
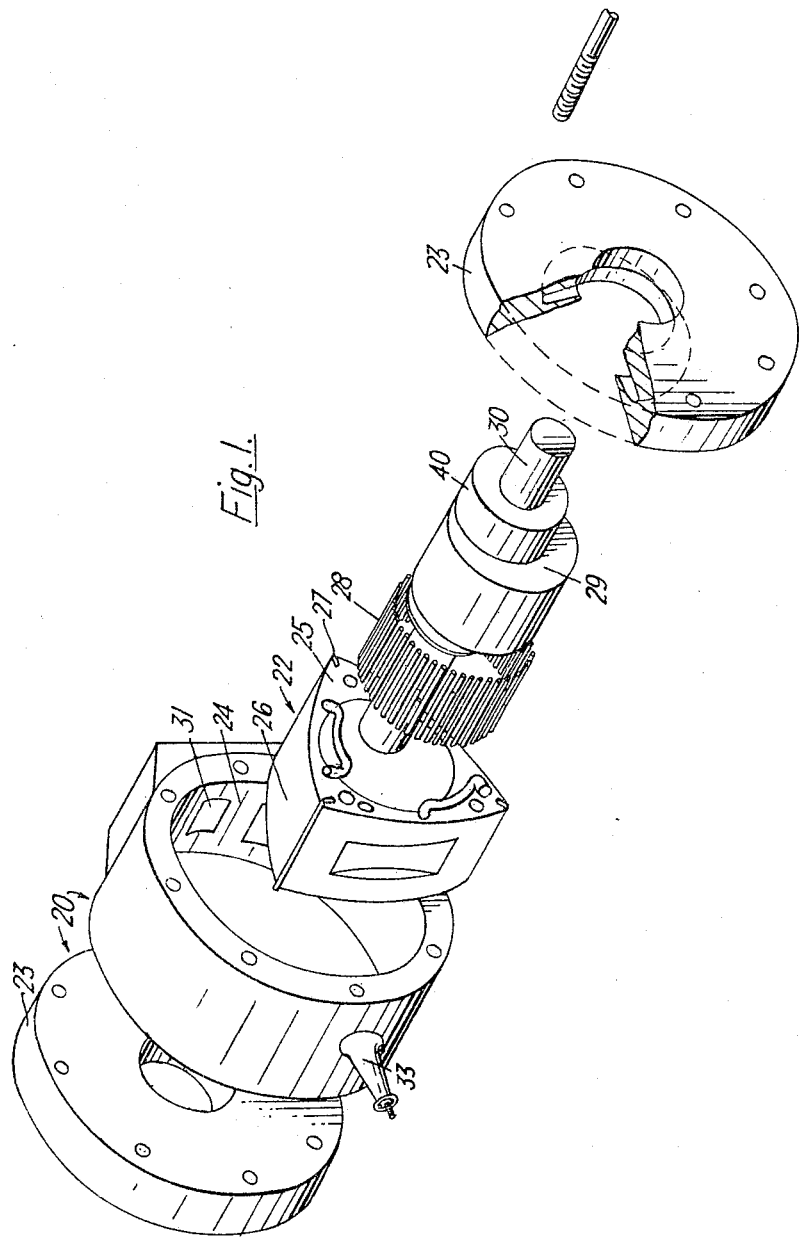
FIGURE 1 is a simplified exploded view of a rotary engine of the type to which the present invention can be applied.

Referring now to FIGURE 3, this is a cross section which shows more detail than is present in FIGURE 1. Enlarged portions 40 of the shaft 30 are journalled inside roller races 41 on the engine housing side walls 23. The shaft 30 is formed integrally with the eccentric 29 and the crank portion 42 coaxial with the eccentric 29 is formed on one side of the latter. The coolant pump comprises a passage-defining structure 44, circular in general appearance and mounted coaxially with the main portion of the rotor 22 and with the eccentric 29. The outline of the structure 44 is seen in FIGURE 4, section IV B and the top flange 45 is secured to the rotor 22 in a recess 46 therein. The passage defining structure 44 closely encircles the crank portion of the shaft 42. Each of three inlet passages 46 comprises a scoop 47, a helical duct 48 extending circumferentially over an angle of about 90° and a straight duct 49 terminating at the end in a short axially extending port 50 communicating with the interior of the rotor 22. The portion of the FIGURE 3 enclosed by a circle is not a plane cross section but a cross section associated with the line III A–III B of FIGURE 4 and is obtained by folding arrow III B on to arrow III A. This constitutes a departure from usual drafting practice but it is thought to assist in an appreciation of the disposition of passage 46. It will be apparent from FIGURE 3 and FIGURE 4 that from the scoop 47 the duct 48 is upwardly inclined until it meets the end of the duct 49 which is flat as seen in FIGURE 3.

The port 50 is positioned inwardly from the apex portions 27 of the rotor 22 as will be seen by reference to FIGURE 10. A further duct 51 within the rotor admits coolant to the coolant cavity or reservoir 52 proper. Still referring to FIGURE 10 it will be seen that there are three discharge ducts 53 opening from the cavity 52 in the region of the apex portions of the rotor. These lead to ports 54 in the structure 43 and thence along horizontal ducts 55 (as seen in FIGURE 4) to a coolant exhaust pipe 56.

The lower side wall 23 of the housing (as seen in FIGURE 3) is shaped to define a trough or reservoir 57 which permits a clearance between the scoop 47 and the side wall 23. A series of ghost outlines show the paths of scoop 47 and pipe 56 during a part of their paths and it will be apparent that the contour of the side wall 23 is such as to permit this. A coolant jet pipe 58 is arranged to discharge water in the direction of the arrows 59 in FIGURE 4. Coolant from the jet pipe 58 is collected by the scoop 47 and a "slug" of coolant is taken into the duct 48. When the slug of coolant has been taken into the passage 48 the rotating acceleration field which moves clockwise as seen in FIGURE 4 sweeps past and moves the slug along the ducts 48 and 49. An important part of the disposition of the ducts 48 and 49 in relation to each other is that they offer no impediment to circumferential motion of the coolant. Furthermore, coolant descending through the port 54 is subject to the action of the rotating acceleration field and when it reaches the duct 55 is urged towards the discharge pipe 56. The arrow 60 in FIGURE 4 and FIGURE 6 represents the direction of rotation of the rotor with respect to the stationary housing while the arrow 61 represents the direction of rotation of the rotating acceleration field the speed of rotation of the latter being three times as great as that of the former.

Thus the coolant is lifted into the rotor and discharged therefrom mainly through the agency of the rotating acceleration field. A second coolant jet pipe is arranged at a point in the end wall 23 diametrically opposite to jet pipe 58. Thus two slugs of coolant will be delivered to the rotor per revolution. Further jet pipes can be arranged in further troughs if necessary.

The lower end wall 23 constitutes a receptacle 63 into which the coolant from pipe 56 can discharge and into which the coolant not collected by scoop 47 can fall. The trough is provided with a hole or holes 64 through which the coolant can be returned to a radiator if the cooling system has a closed circuit or through which the coolant can be exhausted if the cooling system has an unlimited supply of coolant. A flinger ring 65 rotates with the shaft for the purpose of keeping coolant away from the journal bearings 41.

The engine shown in FIGURE 5 is basically similar to that of FIGURE 3 and many parts will clearly be identical. The embodiment of FIGURE 3 made use of the fact that there was a relative rotation between the rotor and the stationary housing. The instant embodiment (FIGURE 5) makes use of the fact that there is a relative rotation between the rotor 22 and the shaft 30. The passage-defining structure 65 of FIGURE 5 defines a duct 66 extending circumferentially and helically and having a flared inlet end 67. The outlet end of the duct 66 continues into a horizontal straight duct 68 terminating in a port 69. The coolant after flowing through a rotor 22 emerges from the port 70 and horizontal duct 71 through the discharge pipe 72. The rotating acceleration field acts on coolant in ducts 66 and 68 to move it into the rotor and in the case of coolant in duct 71 to move it out of the rotor.

The portion of FIGURE 5 within the circle represents a cross section of the passage defining structure associated with line V A–V B of FIGURE 6 and is obtained by folding arrow V B on to arrow V A. This constitutes a departure from usual drafting practice but it is thought to assist in an appreciation of the disposition of passage 66. The edge 23a of the side wall 23 recedes from the path of the passage 66 as the passage defining structure goes round and at station V C has receded sufficiently for the passage 66 to pass between it and the cranked portion 42 in an upwardly inclined direction. This is the reason for the apparent discontinuity between passages 66 and 67 as seen in FIGURE 5.

The coolant source in this embodiment is provided by a circular water trough 73 rotating with the shaft 30. The trough comprises an annular plate 74 secured to the shaft 30 adjacent the crank portion and an annular side wall 75 extending above and below the annular plate 74 at the outer periphery of the latter. The trough 73 has a roof 76 secured to the top of the annular side wall 75 which extends to within a fixed distance of the crank portion 42 all the way around. The fixed distance is to permit the rotation of the flared portion 67 of the structure 65 below the level of the roof 76. As the flared portion 67 rotates inside the trough 73, it alternatively recedes from and approaches the side wall 75 which is travelling at three times the speed of the flared portion 67. Coolant is introduced into a lower trough 77 formed by the annular plate 74, the lower part of the side wall 75 and an inwardly extending rim 78, by injecting it from a coolant passage 79 formed in the adjacent stationary end wall 23 of the housing 20. Through holes 80 are provided in the annular plate 74 for coolant to percolate through to the trough 73 there to form a rotating mass of coolant which is constantly catching up with the flared portion 67 whenever the latter dips into the coolant. As soon as a slug of coolant is introduced into the flared portion 67 of the duct 66 the rotating acceleration field moves the slug along the portions 67, 68 and 69 of the duct 66 into the rotor 22.

The structure 65 is such that it has only a single wall seen in FIGURE 5 at the point 81 where it approaches closest to an edge 23a of the side wall 23. This permits the aperture 83 (FIGURE 6) through the structure 65 to be the largest possible to accommodate a larger crank portion 42 than in the previous embodiment.

The embodiment shown in FIGURE 7 is similar to that of FIGURE 5 in that it obtains its coolant from a source rotating with the shaft 30. The coolant source comprises a trough 85 having a roof 86, a peripheral wall 87 and a lower rim 88 into which is pumped a coolant from the passage 89 in the side wall 23. A C-shaped space 90 is contained between an inner and an outer semicircular walls 91 and 92 attached to the roof 86. The semicircle has the axis of the eccentric for centre and a radius somewhat larger than that of the crank portion 42. The C-shaped space 90 communicates with the trough 86 through an arcuate slot 93 in the roof 86 as seen in FIGURE 8 section VIII A. The centrifuging coolant level in the trough 85 never rises higher (in a radial direction) than the rim 88, accordingly there is never need for the arcuate slot 93 to extend to a position radially inwardly (with respect to the shaft axis) of the rim 88. Coolant flowing through the slot 93 fills the space 90 and is urged axially outwardly therefrom by pressure of centrifuged coolant in the trough 85.

Section VIII C in FIGURE 8 is a cross section through the passage-defining structure 94 and shows an inner and outer walls 95 and 96 respectively, these walls being joined together by twelve ramps 97. FIGURE 9, being an elevation on the inner wall 95, the outer wall 96 being removed, shows the disposition of the ramps 97 in relation to the inner wall 95. The upper ends of the ramps terminate in a swirl gallery 98 and ducts 99 lead from the gallery to a rotor inlet port 100.

Below the ramps 97 the walls 95 and 96 taper to overlap the top ends of the semicircular walls 91 and 92 so that coolant passing from the space 90 is picked up by the bottom ends of the ramps. As soon as coolant is present on the ramps it moves with the motion of the rotor and is thus subject to the influence of the rotating vector field. Under such influence the coolant is moved up the ramps into the swirl gallery and from there into the rotor through the ducts 99 and port 100. The embodiment shown in FIGURES 7 to 9 illustrates the use of a large number of ramps to effect movement of the coolant into the rotor 22. The discharge of coolant from the rotor is accomplished by the rotating acceleration field through the discharge port 101, duct 102 and exhaust pipe 103 (see section VIII B FIGURE 8).

In both the embodiments shown in FIGURES 5 to 9 coolant exhausted from the rotor and excess coolant is carried away from the receptacle 63 through the holes 64 and the coolant is prevented from reaching the bearings 41 by the presence of the rotating trough which acts as a flinger.

In FIGURES 11 and 12, there is shown a simplified form of rotary engine in which the rotor 104 has a three lobed epitrochoidal shape and the cavity 105 in which it turns has an externally related shape. In this engine the smaller gear 106 is fixed to the rotor 104 while the larger gear 107 is fixed to the stationary housing 108 of the engine. The housing comprises a peripheral wall 109 and two side walls 110. A shaft 111 is journalled in both side walls 110 and carries an eccentric 112 and adjacent crank portion 113. The rotor 104 is rotatably mounted on roller bearings 114 carried by the eccentric 112. A flinger ring 115 is provided to prevent water reaching the journal bearings 116.

The direction of rotation of the rotor 104 of the present engine will be opposite to that of the shaft 111. Accordingly the passage-defining structure 117 is arranged to pick up coolant from a trough 118 in the lower side wall 110 while moving in an anti-clockwise direction, assuming the shaft to be rotating clockwise as seen in FIGURE 11. The passage-defining structure 117 will be exactly like the passage-defining structure shown in FIGURE 6 when picking up coolant from a trough in the housing 118 and water jet pipes similar to pipes 58 will be placed in the side wall 23 to supply coolant.

It will be appreciated that the embodiment described with reference to FIGURE 6 can equally well be applied when it is desired to pick up coolant from a rotating trough and that the acceleration field will perform its function of moving coolant into and out of the rotor as before.

In FIGURE 13 there is seen a diagrammatic representation of the rotary acceleration field. A finite number of points 118 have been chosen and a line extends from each one to represent an acceleration vector 119. The direction of the line indicates its direction in relation to the centre of the rotor and to the other vectors. All the vectors radiate from the origin O of the field which is a certain distance from the rotor centre as will be explained. The length of each vector 119 represents the magnitude of the acceleration acting on the point 118. The centre of the rotor is indicated by R and the centre of the shaft by S, the distance between them being the eccentricity $e$.

The field origin O is always on a line passing through R and S and is always on the shaft side at a distance of $ne$ from the rotor centre R. The value of $n$ is obtained from the relationship.

$$n = (O/O_1)^2$$

where $O$ = angular velocity of the shaft; and
$O_1$ = angular velocity of the rotor.

The ration $O/O_1$ is the velocity ratio of the engine and is a fixed quantity for an given engine. For example: In the engine described with reference to FIGURES 1 to 10 the shaft velocity is three times the rotor velocity so $n=9$ and the distance between O and R in this case is $9e$. In the engine described with reference to FIGURES 11 and 12 the shaft velocity ratio is equal to the number of lobes on the rotor 104, i.e., three. Hence the distance between O and R for this engine is again $9e$.

The magnitude $a$ of the acceleration at a point 118 is determined as follows:

$$a = \frac{O^2 r}{(O/O_1)^2}$$

where $r$ = distance of the point 118 from 0. For example in either type of engine described if the shaft speed is 2000 r.p.m. and the distance $r$ is 3 inches, the acceleration to which a point on the rotor would be subjected instantaneously while its position, corresponded with 118 would be $$a = \frac{(2000 \times 2\Pi)^2}{(60)} \times \frac{3}{9} \text{ in./sec.}^2$$

$$= 453 \, g$$

It will readily be seen that the general shape of the field is a fan with the magnitude of the field increasing as $r$ increases. Also the maximum intensity of the field is on the line extending through O, S and R and the intensity falls off on each side of this line.

FIGURE 14 illustrates the effect on particles of coolant contained in a tube 120 moving with the motion of the engine described with reference to FIGURES 1 to 10. The positions $u, v, w, x, y, z$ of the tube correspond to the positions, U, V, W, X, Y, Z of the rotor centre R and positions OU, OV, OW, OX, OY, OZ of the field origin O. The acceleration forces diverge from OU when the scoop is in position $u$ and so on. In position U the coolant is beginning to enter the scoop 121 and its entry is facilitated if not assisted at this point by the rotating field the direction of which is apparent from the arrows 122. In position $v$ the field is acting in a general direction which will either assist or resist entry of coolant into the tube. The tube in position $w$ is now charged with a quantity of coolant but the field has turned to resist the entry of more coolant and the coolant that has not turned the bend in the scoop 121 will be ejected thus leaving a "slug" of coolant in the tube. As the field turns successively through positions x, y and z of the tube, because it is moving three times as fast as the latter, the slug of coolant follows the field around the tube in the same manner that wate in an U-tube will move relative to an U-tube when the latter is rotated. The length of the tube to its discharge point is immaterial because the slug of coolant will follow it round and round as far as required. The tube 120 must not be allowed to turn back on itself and form a barrier to the passage of the coolant slug.

The size of the tube 120 or the passage must not be so small that pipe friction effects are so large in comparison with the acceleration forces that the slug of coolant is left behind in the tube.

It will be obvious from the foregoing that the invention provides a simple means of circulating coolant through the rotor of a rotary engine of the type referred to without the disadvantages of high pressure circulated coolant arrangements.

Other applications, modifications and combinations will be readily apparent to those skilled in the art and are deemed to be within the scope of the invention which is limited only by the following claims.

What I claim is:

1. In a rotary engine of the type having a housing having a first trochoidal internal profile, a rotor operatively rotatable within said housing having a second trochoidal external profile, said rotor profile being disposed within the housing profile in rolling relationship thereto, constraining means to maintain said profiles in rolling engagement with each other, and power transmitting support means for said rotor; cooling means for said rotor including the combination of liquid reservoir means in said engine, supply conduit means connecting said reservoir to a source of coolant, discharge conduit means spaced from said supply conduit means connected to said reservoir for discharging coolant therefrom, said rotor having coolant intake passage means therein including at least one entry opening continuously open to and periodically communicating with said reservoir for receiving said coolant and at least one exit opening, said exit opening communicating with a hollow compartment within said rotor, discharge passage means in said rotor having an entry opening connected to said hollow space and an exit opening communicating with said reservoir at a point circumferentially spaced from said intake passage entry opening, the disposition of the intake passage between its openings being such that coolant is moved freely from said entry opening to said exit opening under the influence of acceleration forces engendered by the motion of said intake passage means during rotation of said rotor.

2. An engine as claimed in claim 1 wherein said intake passage means has at least a portion thereof extending helically with respect to the axis of the rotor.

3. An engine as claimed in claim 1 wherein said passage means has at least a portion thereof extending spirally with respect to the axis of the rotor.

4. An engine as claimed in claim 1 wherein said reservoir is stationary relative to said housing.

5. An engine as claimed in claim 4 wherein said reservoir is formed in said housing and includes a trough and said intake passage entry opening is formed as a scoop and is arranged to collect coolant from said trough in the housing periodically during its motion.

6. An engine as claimed in claim 1 wherein said reservoir is formed as part of said power transmitting means and said intake passage entry opening is arranged to receive coolant therefrom.

7. An engine as claimed in claim 6 wherein said reservoir includes a trough rotating with the power transmitting support means into which the entry opening dips periodically during its motion.

8. An engine as claimed in claim 6 wherein said reservoir is constituted by a trough rotating with the shaft and having an extension therefrom which projects adjacent to said intake passage means.

9. An engine as claimed in claim 8 wherein said intake passage means includes a multiplicity of ramps leading to a swirl gallery within said rotor.

10. A engine as claimed in claim 9 wherein coolant ducts extend within said passage-defining means from said swirl gallery to said hollow space in said rotor.

11. A pump for pumping fluid through a rotating member including a housing, shaft means rotatable within said housing, said shaft having an eccentric thereon, a rotor rotatably mounted on said eccentric, means on said rotor cooperating with means in said housing for maintaining a rolling relationship of said rotor within said housing a fluid reservoir formed within said housing, fluid entry means on said rotor extending into said reservoir, fluid exit means on said rotor opening into said reservoir, passage means in said rotor connecting said entry means and said exit means, said passage means being arranged to cause fluid collected by said entry means to move through said passage and out said exit means back into said reservoir under the influence of acceleration forces caused by the motion of said rotor and means for supplying fluid to said reservoir and draining fluid therefrom said entrance means being located at a greater radial distance from the axis of rotation of said shaft than the exit means and at least a portion of said passage connecting said entrance and exit means being located radially outward of both said entrance and exit means and a portion being located radially inward of both of said means whereby fluid entering said entrance is first moved radially inward, then radially outward and finally radially inward.

References Cited by the Examiner

UNITED STATES PATENTS

| 2,939,626 | 6/1960 | Birmann | 230—207 X |
| 3,091,386 | 5/1963 | Paschke | 123—8 X |
| 3,131,679 | 5/1964 | Peras | 123—8 |
| 3,176,916 | 4/1965 | Sollinger | 123—8 X |

MARK NEWMAN, *Primary Examiner.*

F. T. SADLER, *Assistant Examiner.*